United States Patent
Karlsson

(10) Patent No.: US 10,305,808 B2
(45) Date of Patent: May 28, 2019

(54) WIRELESS COMMUNICATION SYSTEM FOR TRAINS USING VOICE OVER WIFI (VOWIFI)

(71) Applicant: ICOMERA AB, Göteborg (SE)

(72) Inventor: Mats Karlsson, Välberg (SE)

(73) Assignee: ICOMERA AB, Gothenburg (DE)

( * ) Notice: Subject to any disclaimer, the term of this patent is extended or adjusted under 35 U.S.C. 154(b) by 0 days.

(21) Appl. No.: 15/521,446

(22) PCT Filed: Oct. 26, 2015

(86) PCT No.: PCT/SE2015/051132
§ 371 (c)(1),
(2) Date: Apr. 24, 2017

(87) PCT Pub. No.: WO2016/068781
PCT Pub. Date: Jun. 5, 2016

(65) Prior Publication Data
US 2017/0317939 A1   Nov. 2, 2017

(30) Foreign Application Priority Data

Oct. 30, 2014   (SE) .................................. 1 451 302-2

(51) Int. Cl.
*H04L 12/801*   (2013.01)
*H04B 1/50*   (2006.01)
(Continued)

(52) U.S. Cl.
CPC ........... *H04L 47/24* (2013.01); *H04W 84/005* (2013.01); *H04L 63/164* (2013.01); *H04W 84/12* (2013.01)

(58) Field of Classification Search
CPC .... H04L 47/24; H04L 63/164; H04W 84/005; H04W 84/06
See application file for complete search history.

(56) References Cited

U.S. PATENT DOCUMENTS 9,609,569 B2 *  3/2017  Byers .................... H04W 16/28
2006/0172722 A1   8/2006  Christensen et al.
(Continued)

FOREIGN PATENT DOCUMENTS

EP   1 175 757 B1   1/2005
EP   2472740 A1   4/2012
(Continued)

OTHER PUBLICATIONS

Extended European Search Report dated Apr. 30, 2018, issued by the European Patent Office in corresponding European Application No. 15854861.0-1214 (13 pages).
(Continued)

*Primary Examiner* — Faruk Hamza
*Assistant Examiner* — Abusayeed M Haque
(74) *Attorney, Agent, or Firm* — Buchanan Ingersoll & Rooney PC

(57) ABSTRACT

A wireless communication system for a train, including: a plurality of antennas arranged on an exterior side of the train; an internal local area network (LAN) inside the train; and at least one router in the train for receiving and transmitting wireless voice communication and data communication to and from a stationary communication server outside the train via the antennas, through at least one exterior mobile network, the at least one exterior mobile network providing at least two concurrently useable data links. The internal LAN provides WiFi communication between the at least one router and at least one mobile terminal located inside the train. Further, the router is arranged to transfer wireless voice communication via voice over WiFi (Vo-WIFI) between the at least one mobile terminal and the exterior mobile network.

11 Claims, 4 Drawing Sheets

(51) Int. Cl.
    *H04L 12/751*     (2013.01)
    *H04L 12/851*     (2013.01)
    *H04W 84/00*     (2009.01)
    *H04W 84/12*     (2009.01)
    *H04L 29/06*     (2006.01)

(56) References Cited

U.S. PATENT DOCUMENTS

| | | | |
|---|---|---|---|
| 2006/0221933 A1* | 10/2006 | Bauer | H04W 28/18 370/352 |
| 2007/0011301 A1* | 1/2007 | Ong | H04L 61/2015 709/224 |
| 2007/0030857 A1 | 2/2007 | Fulknier et al. | |
| 2008/0137659 A1* | 6/2008 | Levy-Abegnoli | H04L 45/00 370/392 |
| 2008/0240029 A1 | 10/2008 | Lynch et al. | |
| 2009/0010200 A1* | 1/2009 | Lauer | H04B 7/18506 370/316 |
| 2011/0038252 A1* | 2/2011 | Chung | H04W 74/04 370/216 |
| 2011/0116373 A1 | 5/2011 | Lauer | |
| 2013/0310021 A1 | 11/2013 | Bergek et al. | |
| 2016/0006500 A1* | 1/2016 | Radpour | H04B 7/18539 370/319 |
| 2016/0249233 A1* | 8/2016 | Murray | B61L 27/0005 |

FOREIGN PATENT DOCUMENTS

| | | |
|---|---|---|
| EP | 2 665 331 A1 | 11/2013 |
| EP | 2 943 011 A1 | 11/2015 |
| WO | 00/67435 A1 | 11/2000 |
| WO | WO 2014/160479 A1 | 10/2014 |

OTHER PUBLICATIONS

Office Action (Notice (4 months)) dated Dec. 4, 2017, by the Swedish Patent and Registration Office in Swedish Patent Application No. 1451302-2 (6 pages).

International Search Report (PCT/ISA/210) dated Feb. 1, 2016, by the Swedish Patent Office as the International Searching Authority for International Application No. PCT/SE2015/051132.

Written Opinion (PCT/ISA/237) dated Feb. 1, 2016, by the Swedish Patent Office as the International Searching Authority for International Application No. PCT/SE2015/051132.

Swedish Office Action dated May 19, 2015 in Swedish Application No. 1451302-2.

* cited by examiner

WIRELESS COMMUNICATION SYSTEM FOR TRAINS USING VOICE OVER WIFI (VOWIFI)

TECHNICAL FIELD OF THE INVENTION

The present invention relates to a wireless communication system for moving vehicles, and in particular trains.

BACKGROUND

There is today an increasing demand from passengers to be able to communicate through mobile phones and other handheld terminals when travelling on trains, and also to be able to get access to the Internet with laptops, PDAs etc. However, train carriages are made of metal, and even the windows are normally covered with a metal film. Accordingly, train carriages are shielded compartments, and direct communication between terminal antennas within the carriages and externally located antennas is difficult to obtain. Further, with the new smartphones, and the way these are used, with e.g. continuously operating applications, many phones are active at all times, meaning that many handovers are required when the train moves. Even though this problem is common for all moving vehicles, it is especially pronounced for vehicles moving at high speed, such as trains.

To this end, train carriages are often provided with an external antenna connected to a repeater unit within the carriage, which in turn is connected to an internal antenna. Hence, the communication between the passengers' terminals and the operator antennas outside the trains occurs through the repeater unit. Similarly, it is known to provide a mobile access router for data communication, also connected both to an external antenna and an internal antenna, in each carriage, in order to provide Internet access on-board the train. Such mobile access router solutions are e.g. commercially available from the applicant of the present application, Icomera AB, of Gothenburg, Sweden.

However, today's systems are not entirely satisfactory. Trains often pass through areas with bad radio coverage, and the repeater units, nowadays handling both traditional voice communication and data communication, through e.g. 3G, are often unable to handle the required traffic. As a consequence, telephone conversations will often be disrupted and disconnected inadvertently.

Another drawback with today's systems is that there is a frequent need for upgrading of the systems, since the repeater units need to be able to handle all available frequency bands and be up to date with all new system requirements. This means that several units in each carriage frequently need to be replaced, which is a very costly procedure. It is also difficult to supervise the operation of the different components of the system, which leads to cumbersome and costly error detections etc in cases of malfunction. As a consequence, the operation performance is often deteriorated due to problems not being recognized. Malfunctioning repeaters also often deteriorate other communication equipment on-board a train, such as data communication equipment. Further, even properly functioning repeaters may deteriorate the performance of other communication equipment.

Another drawback with today's systems is that the repeater units and the mobile access router require a significant amount of space and power. Consequently, these units need to be placed in a separate cooled compartment on the train. Since both power and space is a scarce resource on-board a train, this significantly adds to the costs of using the known systems.

Still another drawback with today's systems is that is difficult or even impossible to implement new and more efficient transmission solutions, such as MIMO.

In EP 2 665 331 by the same applicant, a wireless train communication system is disclosed using femtocells in the train. Even though this solution has provide to be a very efficient remedy to at least some of the above-discussed general problems, it is still not useable in all situations, and also it requires use of dedicated, licensed frequencies, which are costly and may not always be available. The use of such frequencies in a moving vehicle may also be problematic. Further, this solution often requires that an agreement is reached with all operators, which in practice may be difficult. Still further, even though this known solution provided great cost advantages compared to previous solutions, it is still relatively costly to install and maintain.

There is therefore a need for an improved train communication system which provides better capacity and/or lowers the overall costs of installing and maintaining the system. Even though the above discussion is focused on trains, similar situations and problems are at least to some extent encountered in many other types of moving passenger vehicles, such as buses, ships and airplanes.

SUMMARY OF THE INVENTION

It is therefore an object of the present invention to provide a wireless communication system for a train which alleviates all or at least some of the above-discussed drawbacks of the presently known systems. Another object of the invention is to provide a wireless train communication system which, to a relatively low cost, provides good or improved voice communication to a plurality of users.

This object is achieved by means of a wireless communication system for a train as defined in the appended claims.

According to the present invention, there is provided a wireless communication system for a train, comprising:

a plurality of antennas arranged on an exterior side of the train;

an internal local area network (LAN) inside the train;

at least one router in the train for receiving and transmitting wireless voice communication and data communication to and from a stationary communication server outside the train via said antennas, through at least one exterior mobile network, the at least one exterior mobile network providing at least two concurrently useable data links;

wherein the internal LAN provides WiFi communication between the at least one router and at least one mobile terminal located inside the train; and wherein the router is arranged to transfer wireless voice communication via voice over WiFi (VoWIFI) between the at least one mobile terminal and the exterior mobile network.

The LAN may be provided by one or more wireless access points within the train. Preferably, at least one such wireless access point is provided in each carriage. All wireless access points may be connected to a single, central router, arranged in one of the carriages.

The VoWIFI is preferably used in accordance with the IEEE 802.11 standard, and may also be referred to as voice over WLAN (VoWLAN), but other wireless internet networks may also be used.

VoWIFI may also be referred to as Wi-Fi calling, or GAN/UMA (Generic Access Network or Unlicensed Mobile Access). VoWIFI enables the user to make standard phone calls over Wi-Fi. This is done by routing the call traffic through the Wi-Fi connection, instead of over the air to a cell tower. In VoWIFI the user dials the number, and place the call in a conventional way, just like in a circuit switched environment. However, the difference is that the call connects over Wi-Fi, and is transferred in data packets, and is subsequently injected back into the cellular network as if the call had been beamed over the air. Unlike services like Skype and other Voice over IP (VoIP) applications, which places calls using call forwarding or an internet-based interface, VoWIFI lets the user use the ordinary carrier phone number over the internet. VoWIFI is also distinct from VoIP technology in that VoIP transfers the voice over the internet to the switched telephone network, whereas VoWIFI connects the voice traffic to the mobile carrier's network using the internet instead of cell towers.

The present invention enables a system which at the same time is very cost-efficient and provides very good communication capabilities, both for voice and data, and enables the system to be used simultaneously by a plurality of users.

The present invention makes previously used repeaters and pico and femto cells redundant and superfluous, and thus, the present system is preferably operated without any repeaters or pico or femto cells.

By means of the present invention, data traffic containing voice communication may be forwarded with high rate and throughput.

The "router" is preferably a networking router, which is a machine that forwards data packets between computer networks, on at least said two data links in each direction.

The present invention provides a centralized system, having a central system with a router. The router may be a mobile access router, and preferably a mobile access and applications router. Due to the centralization of the system, installation and upgrading becomes much simpler and more cost-efficient. Instead of having to replace and/or upgrade units in each carriage, only a few units need to be replaced and/or upgraded. Further, most updates, such as adaptation to new networks, can in the present system be made solely in the router, or in a separate controller. The router can be updated relatively simply, e.g. by replacing or adding a new modem to the router. Consequently, there is a dramatic decrease in cost for installation and service.

Further, this solution enables users with terminals to get access to voice telephony and data traffic at all locations within the train. Further, better coverage and conditions, and better capacity for voice communication is achieved. The result is that more calls can be handled simultaneously, and with fewer inadvertently disconnected calls. The present invention efficiently solves the problem of handling handover for many people assembled together and travelling at high speed onboard a train. Thus, an efficient full service communication solution is obtained, which may simultaneously be used for internet access, speech, and other services.

In this centralized system, the train as a whole may be seen as a very limited number of terminals requiring handover as the train moves—i.e. each modem through which the router communicates with exterior networks may be seen as a "terminal", rather than each terminal used on-board the train. Thus, the number of "terminals" is typically reduced to less than 6, rather than the total number of terminals used in the train, which would typically be about 200, or even as many as 500.

Further, the previously known solutions require a large amount of power. Typically more than 400 W/carriage is necessary for the operation of the repeater units alone. This also leads to a significant heat generation, and a need to place the repeater units in separate cooled compartments. On the contrary, the presently proposed system can be operated with significantly lower power. This result in great savings in respect of the power consumption on the train, and also leads to significantly less heat generation, and separate cooling and the like is no longer necessary. Consequently, the units may be placed in any location on the train, and for example in an overhead compartment—a space which is rarely used. Consequently, the space utilization in the carriages becomes much more efficient.

Compared to the known solution discussed in EP 2 665 331 by the same applicant, this new invention can be used on common, freely available frequencies, and also requires no additional hardware to be installed or maintained in the train.

In addition, the use of VoWIFI makes adequate billing of the users simple. Each user using VoWIFI could be billed directly by his/hers operator, and the train operator, etc. need not be involved.

Of a particular advantage is if the mobile terminal uses voice over LTE (VoLTE). LTE is a 4G wireless communication technology, known as 3rd Generation Partnership Project (3GPP) long term evolution (LTE), commonly referred to simply as LTE. LTE is a packet switched network technology that supports only packet services, and does not support circuit switched services. VoLTE is based on the IP Multimedia Subsystem (IMS) network. When using LTE, the mobile terminal will provide a seamless transition to a WiFi network, when available, and to the LTE, when WiFi is not available. Thus, when use on a train, the mobile device will always use WiFi for calls, via VoWIFI, but will seamlessly transition the call to VoLTE when e.g. leaving the train at a station.

The provision of router being capable of handling at least two concurrently useable data links can be obtained in various ways, and provides a very stable, reliable and efficient data communication between the train and exterior remote servers and the like. For enabling voice communication via VoWIFI, a stable and good WiFi connection is required, in order to obtain an adequate call quality, and avoid call aborts/interruptions and the like. It has been found that by the use of at least two concurrently useable data links to and from the train, such a good WiFi connection can be obtained, i.e. a connection which is stable, with non-varying or low-varying latency, and essentially no interruptions.

The communication quality can be further improved when the router and the communication server are connected through a plurality of exterior mobile networks, which are simultaneously useable.

Preferably, the at least two different communication routes or data links have different characteristics. These links/routes may be obtained by using different operators and/or by using different technologies. For example, the links may use various combinations of Satellite, HSPA, EDGE, EVDO, LTE, LTE-A, WiFi (802.11) and WiMAX. Further alternatives are naturally also useable.

Preferably, the data traffic is automatically separate between said communication routes/data links based on specific optimization conditions, such as price, latency and/or speed. Such data communication routers are per se known from EP 1 175 757 by the same applicant, said document hereby incorporated by reference. Such routers are also commercially available from the applicant, Icomera AB. Hereby, the router may use all available data channels, such as two or more of e.g. Satellite, HSPA, EDGE, EVDO, LTE, LTE-A, WiFi (802.11) and WiMAX; and combine them into one virtual network connection. In particular, it is preferred to use data links provided through wireless wide-area network (WWAN) communication technologies. An automatic selection is then made among the available channels to use the most cost effective combination that fulfils the users' availability, bandwidth and reliability requirements. Hence, a seamless distribution of the data among the different channels is obtained.

Thus, the two or more data links may be used in combination, for transferring various parts of the same data stream. However, the two or more data links may also be used for different streams, whereby a handover from one link, e.g. provided by one modem, to another link, e.g. provided by another modem, can be made if the first link deteriorates. This can preferably be done without interruption of the stream.

In another embodiment, the wireless communication system further comprises at least one controller arranged to evaluate the quality of said data links, preferably on a host layer, and to assign data streams to said data links at least partly based on said evaluated quality. Such a system is disclosed in co-pending and still unpublished EP application 14167527.2, said document hereby incorporated by reference in its entirety. Even though evaluation on a host layer is preferred, it may also be possible to perform the evaluation on lower layers.

Here, "host layer" refers to one of the higher levels in a communication system model, such as the layers 7-4, or even 7-5 in the OSI (Open System Interconnection) model, ISO/IEC 7498-1, thus excluding the physical layer, the data link layer and the network layer, and preferably also the transport layer.

"Data streams" are traffic in need of routing. A stream is in the context of the present application to be seen as any and all communication with a specific combination of ultimate source and ultimate destination IP addresses and network ports, or whatever the equivalent of this would be in a networking scheme where these identifiers are not used or not sufficiently distinguishing. A stream is "created" when any entity on one side of the system seeks to communicate with any entity on the other side, using any specific combination of ports. Packets in a stream need not be inspected. For the purposes of this invention, a stream may be considered "destroyed" an arbitrary period of time (seconds or tens of seconds) after data has ceased to flow in it. In a phone call made over VoWIFI, the entire call may be considered to constitute a single data stream, or may alternatively be considered to be formed of several consecutive data streams.

"Requests arranged to trigger a determinable automated response" are any active sending of a request or other provocation across a network, through a specific link, with the expectation of receiving a predetermined response, and preferably under a timeout or corresponding safeguard. The specific implementation of such requests may vary, depending on what information that should be determined, communication protocols, target host location, the amount of traffic sent and solicited, and the precise limit set by the timeout function. Obviously, factors external to the individual test, such as the interval between repetitions of the same type of test, is also a potential subject of fine tuning.

However, it is also possible to evaluate the quality of the links based on the ordinary traffic occurring between the router and e.g. a stationary gateway accessible through the exterior mobile network on the available links, For example, this evaluation may be based on the response time to receive acknowledgements, etc.

The router may be a mobile access router, and preferably a mobile access and applications router. The router is preferably at least partly responsible for making the evaluation of quality and assignment of data streams.

The stationary communication server may be any server accessible through the exterior network, such as a DNS server, a gateway through which the communication from the moving vehicle is transferred, a content provider server, or the like.

Measurement of the time until the triggered automated responses are received may be performed in various ways. One way is to measure the exact time (latency) between sending the request and receiving the response. However, the time may also be determined by determining whether the response is received within one or several time frames. For example, it may be determined whether a response is received before a determined time out. This provides a rough estimate of the time. A finer estimate may be obtained by alteration of the time frame(s), by alteration of the size of the sent request, e.g. by adding extra padding, and the like.

In this embodiment, the communication can be automatically optimized based on the evaluation, but also optionally on other conditions, such as price, speed, latency, etc. Thus, in addition to the evaluation, prioritizing and assignments may be made based on other static or dynamic parameters, such as signal strength and the like. Such further optimizations are per se known from the above-discussed EP 1 175 757 by the same applicant. An automatic selection is then made among the available data links to use the most efficient combination. Hence, a seamless distribution of the data among the different data links is obtained.

The selection is preferably made once for each data stream. However, re-selection for data streams that have failed may also be made. Further, data streams may also be split among two or more data links, e.g. by transferring a first part of a data stream on one data link to begin with, and then continue the transfer of the rest of the data stream on another data link, based on a re-assignment decision. Re-selection and/or re-assignment may also be made based on other criteria than complete failure of the presently used data link, such as when the evaluated quality of the link presently used is significantly deteriorated, falls below a certain threshold, or the like.

The controller making the evaluation is preferably arranged on the moving vehicle. However, additionally or alternatively, the controller may also be arranged in the at least one exterior network, and e.g. be arranged within a gateway, as the one discussed in EP 1 175 757. However, unlike the solution presented in that patent, the present solution does not require the use of a gateway, although it is fully compatible with such a device.

The general idea underlying this embodiment is two interlocking parts: Link evaluation, and routing optimization in reaction to said evaluation. The evaluation is made by evaluating the quality of said data links on a host layer by repeatedly sending requests arranged to trigger a determinable automated response to said stationary communication server via said data links, and measure the time until the triggered automated responses are received. It has been found that this is a very efficient way to determine the relevant characteristics of a data link empirically. The purpose of this is to detect and work around problems, not to diagnose them. The tests therefore work on the higher layers of abstraction—the host layers of the OSI model—to probe the soundness of the lower layers.

The test methods may be complemented by knowledge of the nominal maximum throughput (hereafter NMT) assigned to the hardware substrate of each data link, by type.

For instance, the IEEE 802.3-2008 standard defines Gigabit Ethernet, which would have an NMT of approximately $10^9$ bits per second.

The empirical evaluation tests are in this embodiment repeated regularly. For example, a new instance of each test on each link would typically be started at intervals of a few seconds. These intervals may further be adjusted on the basis of probabilities that changes in the router's situation, such as its physical movement, have made older results irrelevant. However, tests should preferably not be run so often that the amount of data transferred by them significantly degrades the primary function of the router, through congestion.

The assignment of data streams to the data links at least partly based on the evaluated quality may occur in various ways. In a preferred embodiment, the available data links are connected to merit values, e.g. integer merit values, based on the evaluated quality, in turn based on the measured test results, and optionally also based on the nominal maximum throughput (NMT) of the links. Preferably, separate merit values are assigned in each direction of traffic to each link. Links may then be weighed against each other at least partly, and preferably entirely, by these merit values. Thus, in one embodiment, all streams to links may be assigned in linear proportion to the merit values of the links.

However, other and possibly more advanced assignment algorithms may be used as well. In the same way that several different empirical tests may be applied for evaluating the quality of the links, any of several different algorithms may be applied to carry out the assignment or reassignment of each stream based on said evaluated quality. Preferably, the assignment algorithm fulfills at least some, and preferably all, of the following criteria:

1. Assignment is superficially random or pseudo-random, insofar as two streams with contiguous source or destination port numbers are approximately as likely to be assigned to two different links, as would be two streams without this relationship. This feature improves the performance of applications that open multiple, contiguous ports.
2. Seen over time in varying conditions, the probability of assignment to a link is proportional to the merit value of that link as a fraction of the sum of all merit values at the time of the assignment. This feature adapts the routing to measured levels of performance.
3. The assignment is registered in such a way that the number of streams assigned to each link can be counted. Each assignment can be re-evaluated when circumstances call for it, e.g. when links disconnect completely or drop so far in merit value that a new assignment should be considered.

The above-described embodiment provides very efficient and dynamic use of the capacity of the available data links, and is also cost-efficient to implement and utilize. For example, the method/system needs no configuration beyond possible knowledge of NMT and the particulars of the tests to be applied, such as ICMP targets. It is highly international, because link evaluation takes place on the host layers, agnostic of local peculiarities. Similarly, it works with any type of data link that supports TCP/IP or any comparable protocol stack, in any combination. Further, since requests arranged to trigger a determinable automated response to said stationary communication server via the data links are quick and easy to measure, and can be repeated at relatively high frequency, the link assignment becomes very quick, dynamic and adaptive.

The evaluation of the quality of the links may be determined solely based on the measured responses to the requests sent out, and the assignment of data streams to the data links may be made solely based on this evaluated quality. However, other static or dynamic parameters may also be brought into consideration for evaluating the quality of the links and/or for making the assignments. For example, parameters such as costs assigned to the different links, bandwidth, signal quality (e.g. signal to noise ratio), number of streams being assigned to the links, etc may be considered. Parameters such as packet loss and throughput may also be considered. Information about such additional parameters may be determined by additional tests. However, information about these parameters may also be obtained from other sources. Similarly, the routing according to the present invention can take other factors into account, including more categorical considerations wherein available links are tiered, limiting the set of available links at any given moment, regardless of their merit values.

In case several tests are performed to evaluate link quality, such tests can be combined in any order, serially or in parallel.

The requests triggering a determinable automated response may be requests to a domain name system (DNS) server. A WWAN Internet service provider (ISP) will normally offer the addresses of one or more domain name system (DNS) servers, as an essential service. DNS queries can be bound to each link, to attempt to resolve a largely arbitrary domain name using one of the ISP's provided servers, or any other. Failure to respond within a given time frame is taken to mean either a general problem transferring the small amount of data, or a more specific problem with the queried DNS server.

Alternatively, the request triggering a determinable automated response may use the ICMP protocol. In particular, it is preferred that the requests triggering a determinable automated response are ECHO_REQEST datagrams, used to trigger an ECHO_RESPONSE from an arbitrary remote host. Further, the ECHO_REQESTs may be provided with a variable amount of extra padding data. Such echo requests is often referred to as "ping" or "pinging".

Unpadded ICMP requests are likely to receive a very high priority, because ICMP is a standard test of network latency. When highly prioritized, it gives the illusion of good overall responsiveness, while payload data in other types of containers gets a lower priority and relatively poor performance in case of congestion. To provide further information, and to enable even better use of the available links, ICMP packets can be padded with extra bytes of data. This provides a simple, universally recognized method of loading down a link with a very precise burst of traffic, and timing the response. The fact that one and the same packet constitutes the load and is timed is the greatest virtue of this test, because it measures how heavy traffic on a link will actually be treated.

The evaluation is preferably made based on an average time for a predetermined number of requests to said stationary communication server via said data links for said automated response to be received, said predetermined number of requests preferably being in the range of 3-10 requests, such as 5 requests.

In case the time is measured by determining if a response is received within a certain time frame, or within certain time frames, the evaluation can be based on determination that a predetermined number of responses being obtained within one or several time frames.

The requests to said stationary communication server are preferably sent at least every 5 second, and preferably at least every 3 second, and more preferably at least every 1 second.

The frequency of sending requests to the stationary communication server may also be adjustable in accordance with at least one other quality parameter of the links. For example, the frequency may be adjusted in accordance with the magnitude and/or volatility of the signal-to-noise ratio (SNR) of the links. Thus, the frequency may be increased when the volatility of the SNR increases and/or when the SNR decreases, e.g. below a certain threshold. Correspondingly, the frequency may be decreased when the volatility is lower and/or when the SNR is higher. The adjustable frequency makes the evaluation and assignment steps more dynamic and adjustable when the SNR conditions are bad.

By concurrently using at least two data links, e.g. in one of the ways discussed above, a very efficient and stable data communication is obtainable, which will in most cases provide very good quality for VoWIFI calls despite the fact that the communication system may also be used for many other types of data traffic at the same time. However, for some applications and in some countries, there may be a need to improve the quality of the VoWIFI traffic even further. This may e.g. be made by the use of a prioritization scheme.

In one embodiment of such a prioritization scheme, the router is arranged to prioritize voice communication and data communication between the router and the communication server differently. Hereby, it is e.g. possible to prioritize voice communication over data communication so that lower latency is obtained for the voice communication. The router may additionally or alternatively be adapted to prioritize data communication transferred via the protocol Internet Protocol Security (IPsec) over data communication transferred via other protocols. Hereby, VoWIFI traffic, which normally occurs via IPsec, will be prioritized. However, this will also prioritize other IPsec traffic, and in a more refined scheme, the router may further be adapted to inspect data packet streams transferred through the router via the protocol Internet Protocol Security (IPsec) to identify data packet streams having a high probability of being voice data packet streams, and to prioritize such identified data packet streams over other data packet streams having lower probability of being voice data packet streams. IPsec tunnels with voice traffic can often be identified with relatively high probability based on the fact that voice traffic is normally more homogeneous in transfer density, i.e. it occurs as a more or less continuous flow, compared to other data traffic, which often occurs in bursts. Thus, the inspection does not need to inspect or analyze the content of the data, i.e. there is no need to look into the tunnel. Instead, the inspection involves looking at the amount and timing of the sent data—i.e. an analysis of the stream rather than the individual packages. Such inspection can e.g. be made by Deep Packet Inspection (DPI) applications, which are per se commercially available.

The system comprises at least two antennas arranged externally on the train connected to the data communication router. This enables the use of efficient communication through the two or more data links. It also enables e.g. MIMO (multiple-input and multiple-output) and/or antenna diversity for the external communication to and from the router. Hereby the router may comprise several antenna ports per modem, enabling MIMO for the external communication, and the high bandwidth thereby provided can then be distributed to the internal clients on the train with e.g. 802.1 in.

These and other features and advantages of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION OF PREFERRED EMBODIMENTS

Figure 1:
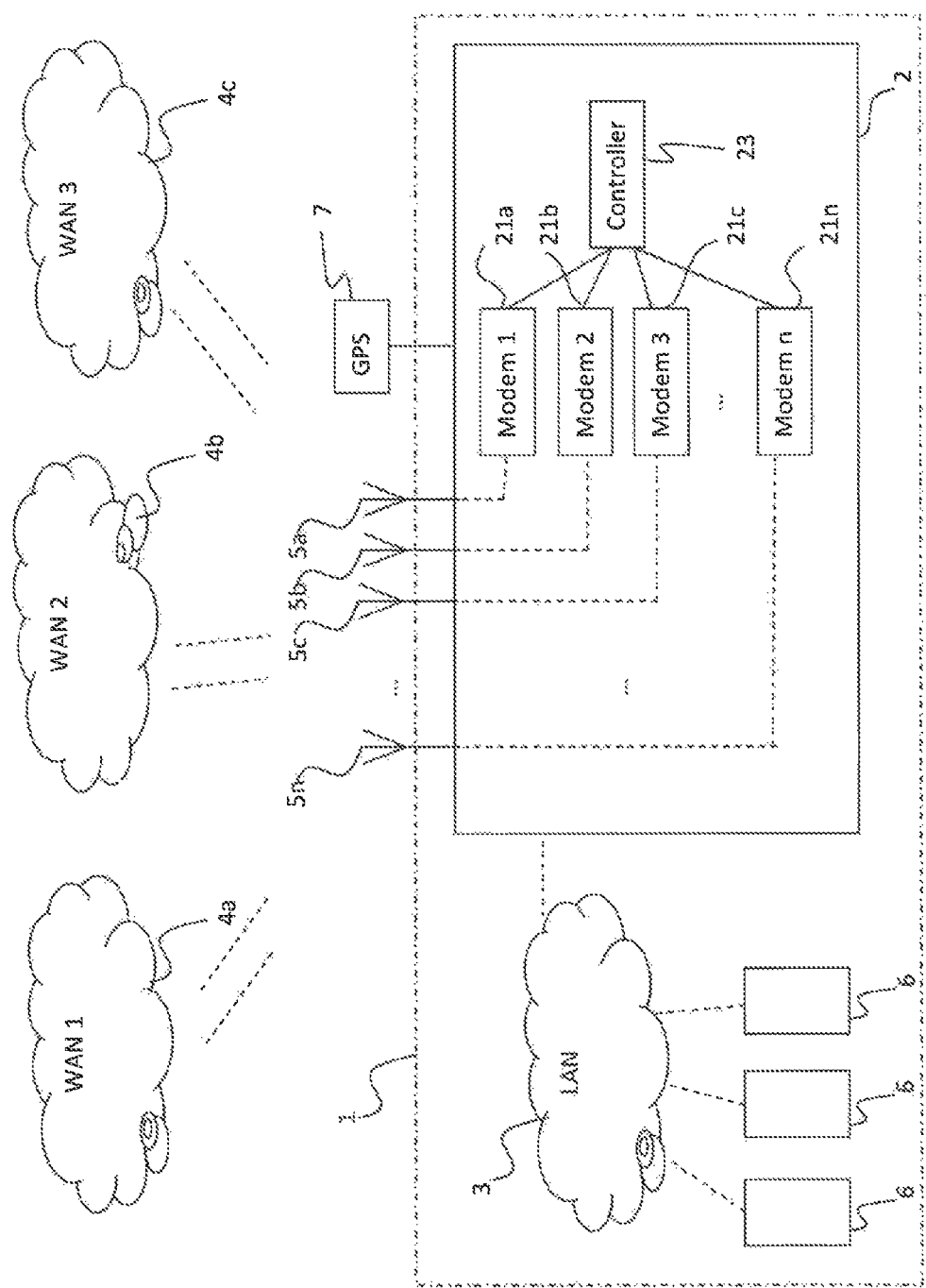
FIG. 1 is a schematic illustration of a train having a wireless communication system in accordance with an embodiment of the present invention.

In the following detailed description, preferred embodiments of the present invention will be described. However, it is to be understood that features of the different embodiments are exchangeable between the embodiments and may be combined in different ways, unless anything else is specifically indicated. It may also be noted that, for the sake of clarity, the dimensions of certain components illustrated in the drawings may differ from the corresponding dimensions in real-life implementations of the invention. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention.

In FIG. 1 a schematic illustration of a vehicle 1, such as a train, having a communication system is provided. The communication system comprises a data communication router 2 for receiving and transmitting data between an internal local area network (LAN) 3, and one or several external wide area networks (WANs) 4a, 4b, 4c. Specifically, the router is adapted for receiving and transmitting wireless voice communication over VoWIFI. Communication to and from the WANs is provided through two or more antennas 5 a-n on the vehicle roof. Two or more data links are available, either between the train and one of the WANs, and/or by using several WANs simultaneously.

The LAN is preferably a wireless network, using one or several internal antennas to communicate with terminal units 6 within the vehicle. It is also possible to use a wired network within the vehicle. The LAN may be set-up as wireless access point(s). The client(s) 6 may be computing devices such as laptops, mobiles telephones, PDAs and so on.

The data communication router comprises a plurality of modems 21 a-n. Assignment of data streams to different WANs and/or to different data links on one WAN is controlled by a controller 23. The controller is preferably realized as a software controlled processor. However, the controller may alternatively be realized wholly or partly in hardware.

The system may also comprise a global positioning system (GPS) receiver 7 for receiving GPS signals indicative of the current position of the vehicle, and wherein the controller may be arranged to assign data streams to various data links also partly in dependence on said received GPS signals.

The data communication router may also be denominated MAR (Mobile Access Router) or MAAR (Mobile Access and Applications Router).

The data communication router is preferably arranged to communicate on at least two different communication routes having different characteristics. Hereby, the communication can be automatically optimized based on specific conditions, such as price, speed, etc. Such data communication routers are known from EP 1 175 757 by the same applicant, said document hereby incorporated by reference. Such routers are also commercially available from the applicant, Icomera AB. Hereby, the router may use all available data channels, such as two or more of e.g. Satellite, HSPA, EDGE, EVDO, LTE, LTE-A, WiFi (802.11) and WiMAX; and combine them into one virtual network connection. An automatic selection is then made among the available channels to use the most cost effective combination that fulfils the users' availability, bandwidth and reliability requirements. Hence, a seamless distribution of the data among said different channels is obtained.

The transferring of data streams through different data links may additionally or alternatively comprises the two main steps: evaluation and assignment. Each of these permits some variability. Numerous types of tests, generating a predictable response, such as an echo, could be performed to evaluate link quality, and such tests can be combined in any order, serially or in parallel. The following are only examples.

Any of a variety of common Internet functions can be taken to indicate the usefulness of a link. For example, a WWAN Internet service provider (ISP) will normally offer the addresses of one or more domain name system (DNS) servers, an essential service. DNS queries can be bound to each link, to attempt to resolve a largely arbitrary domain name using one of the ISP's provided servers, or any other. Failure to respond within a given time frame is taken to mean either a general problem transferring the small amount of data, or a more specific problem with the queried DNS server.

If the queried DNS server belongs to the ISP, the latter will often indicate a severe problem at the ISP for that specific link. Because a DNS request typically consists of a single UDP or TCP packet going each way, this type of test is very light. The infrastructure typically prioritize DNS queries and DNS responses highly in traffic control algorithms, which is another reason why this type of test can be expected to complete very quickly, if at all. The timeout on it can therefore be set very low, producing high responsiveness. The lightness of a DNS test is both an advantage and, to some extent, a drawback. It detects qualitative problems, and is very quick. It also results in a low transfer of data, and does not strain the link, which in turn means that the tests can be repeated very frequently. However, because it does not strain the link, it is a poor indicator of quantitative performance.

Another example of an embodiment therefore uses the ICMP protocol. In this protocol, an ECHO_REQUEST datagram is used to elicit an ECHO_RESPONSE from an arbitrary remote host, preferably a very stable one.

In normal use, ICMP testing is light in the same way as DNS testing. In addition, it is easier for ISPs to prioritize ICMP in unknown ways, because it is a special protocol and does not represent an essential service. Unpadded ICMP requests are likely to receive a very high priority, because ICMP is a standard test of network latency. When highly prioritized, it gives the illusion of good overall responsiveness, while payload data in other types of containers gets a lower priority and relatively poor performance in case of congestion.

As part of the protocol, ICMP packets can be padded with extra bytes of data. This provides a simple, universally recognized method of loading down a link with a very precise burst of traffic, and timing the response. The fact that one and the same packet constitutes the load and is timed is the greatest virtue of this test, because it measures how heavy traffic on a link will actually be treated. In practice, there is often a substantial difference in how a stream of ICMP packets is treated, depending on their size. When padded packets fail to arrive under a given timeout, this is an indicator of performance problems.

The ICMP request may be sent to any type of stationary communication server accessible through the exterior network, such as a DNS server, a gateway through which the communication from the moving vehicle is transferred, a content provider server, or the like.

These embodiments for evaluation mentioned thus far can be generalized as one: any active sending of a request or other provocation across a network, through a specific link, with the expectation of receiving a response under a timeout or corresponding safeguard. Variations on this theme include factors such as protocol, target host location, the amount of traffic sent and solicited, and the precise limit set by the timeout function. Obviously, factors external to the individual test, such as the interval between repetitions of the same type of test, is also a potential subject of fine tuning.

Figure 2:
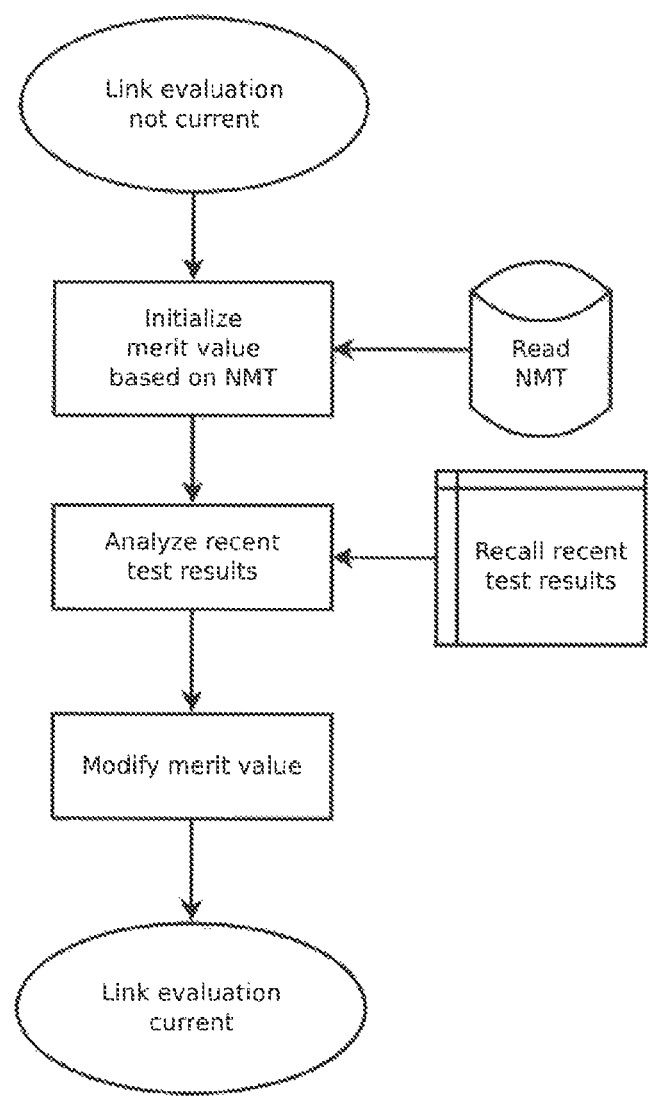
FIG. 2 is a schematic flow chart illustrating an evaluation sequence in accordance with one embodiment of the present invention.

The evaluation may follow the steps as outlined in FIG. 2, where the available data links are connected with merit values, e.g. integer merit values, based on the evaluated quality, in turn based on the measured test results, and optionally also based on the nominal maximum throughput (NMT) of the links. Preferably, separate merit values are assigned in each direction of traffic to each link.

Figure 3:
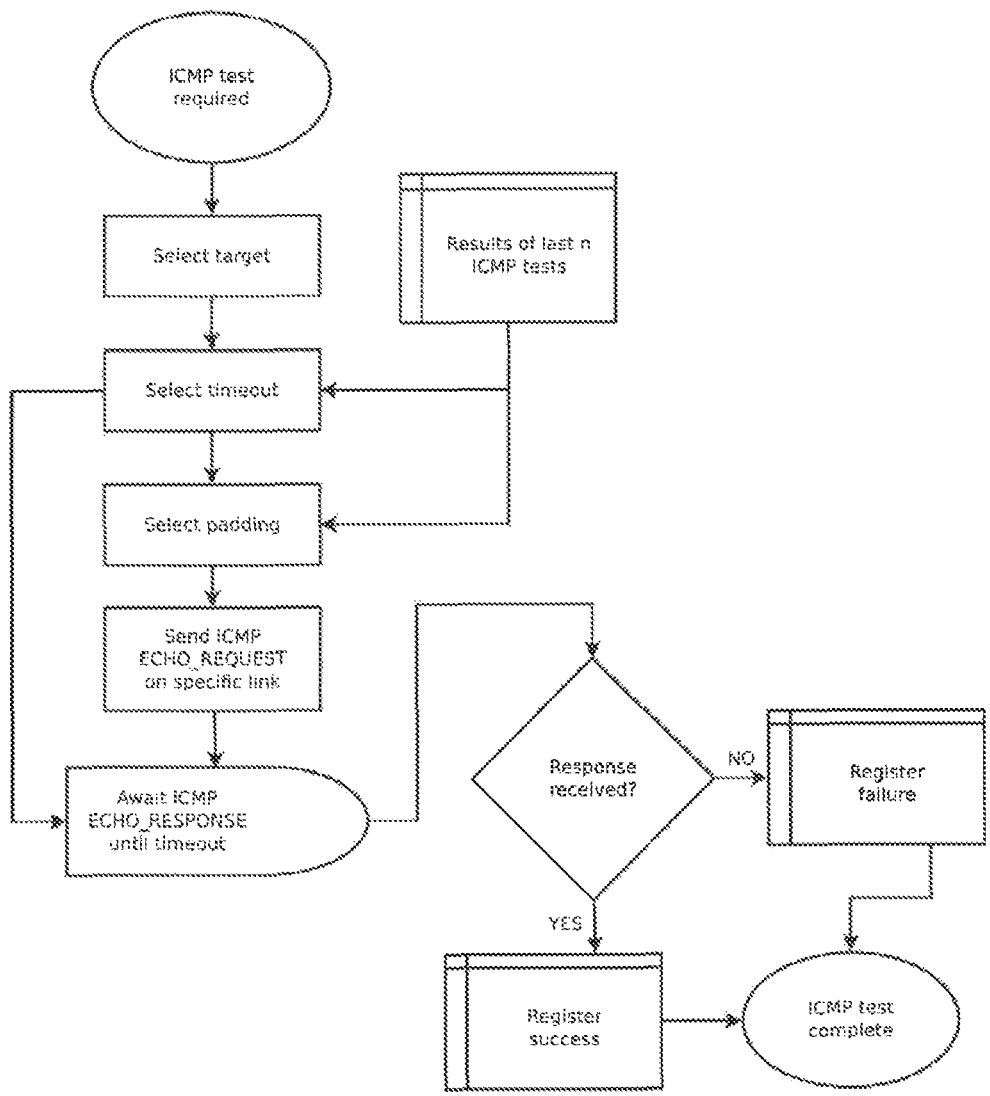
FIG. 3 is a schematic flow chart illustrating an evaluation sequence using adaptive padding in accordance with another embodiment of the present invention.
Figure 4:
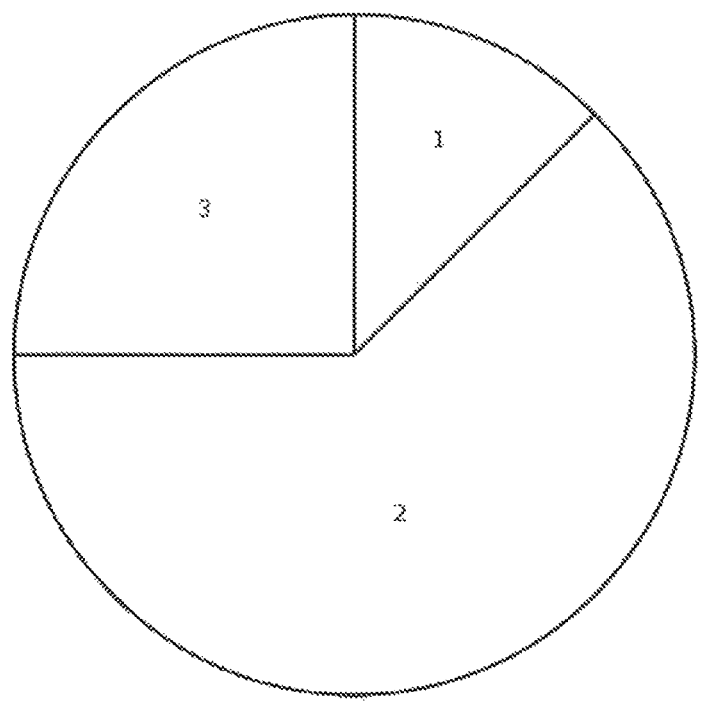
FIG. 4 is an illustration of the principle of link assignment in accordance with an embodiment of the present invention.

A further embodiment may also include some type of adaptive framework around one or more such variables. For instance, this could be a hysteretic influence upon the parameters of an ICMP test. FIG. 3 shows one example, where the size of the packet padding and the timeout imposed on the test are both set as a result of a simple analysis performed on the results of the last n previous tests of the same kind, on the same link. Supposing that n=5, we may refer to the amount of successful tests in that set as s. We then let the timeout (in seconds) t=13−2 s and the padding (in whole bytes) $p=17000 \div 2^{(n-s)}$. In this concrete example, it follows that the first test (s=0) will take place with 531 bytes of padding under a timeout of 13 seconds. If this fails, the second test will be identical. If it succeeds (s=1), the next test will be harder, with 1063 bytes of padding under a timeout of 11 seconds, and so on. If the link performs perfectly, every iteration will eventually use 17000 bytes of padding and require an ICMP response in 3 seconds or less.

This example, where the difficulty of a test varies with each success and failure in recent memory, is applicable to a wide variety of link technologies. For example, older WWAN technologies like EDGE or UMTS are unlikely to pass the most difficult form of the test consistently or at all, but can still be meaningfully evaluated by the easier forms. Under perfectly stable conditions, s will reciprocate around a "threshold of pain" on some level.

In a further embodiment, continuing from the concrete example above, the adaptive ICMP test may be both affected by and manipulate the integer s such that $0 \leq s \leq n$. This value can also serve to influence the merit value of the link, as illustrated in FIG. 2. Given a base merit value $m_B$, based directly on the NMT assigned to the hardware substrate of the link for traffic in one direction, the effective merit value might then be $m_E = m_B \div 2^{(n-s)}$ in that direction. In this example, $m_E$ is ultimately used to compare different links in the routing portion of the invention.

Diagram 3 shows three links numbered 1, 2 and 3, having $m_E$ values proportioned as are 1, 5 and 2, respectively. As a direct result of having a lower NMT or having failed more tests, or both, link 1 is only half as likely as link 3 to receive a new stream of traffic.

Links may then be weighed against each other at least partly, and preferably entirely, by these merit values. Thus, in one embodiment, all streams to links may be assigned in linear proportion to the merit values of the links.

A similar methodology may also be used to re-assign data streams already assigned to a data link to another data link. This is particularly useful for lengthy data streams, such as telephone calls made by voice over IP, streaming media, video calls and the like. However, to avoid too much re-assignments, re-assignment to another data link is preferably only made when one or several predetermined criteria is/are met. For example, re-assignment may take place when one or several of the following conditions are fulfilled:

The presently used data link has failed.

A quality value, such as the above-discussed merit value, of the presently used data link has fallen below a predetermined minimum value.

The quality of the presently used link has been deteriorated to a predetermined extent in relation to other available data links. For example, it may be determined that the merit value of the presently used data link has fallen below a predetermined percentage, e.g. 50%, of the average merit value for all the presently available data links.

In addition to these various active call-and-response methods of link evaluation, there can be many other types. For instance, link merit values can be affected by the number of streams of traffic that are already being routed over the link, by the amount of data flowing as a result of these streams relative to the NMT, by the amount of network errors reported from lower (non-host) levels of abstraction by a network interface driver, etc. Such passive methods would have the advantage of being low in cost, because they do not add to data charges, and of not reducing performance by acting as overhead.

Alongside tests of likely performance, merit values can be adjusted according to arbitrary criteria, based on dynamic or static parameters, and obtainable by further tests or by receiving information from external sources. For example, to take cost into account, merit values can be adjusted without performing any tests at all. For instance, if link 1 is associated with a cost per unit of data sent over it, while link 2 is free, the merit value of link 1 can be reduced by 30% at all times, to meet a cost-benefit analysis.

Another type of embodiment would be to combine the advantages of active and passive tests by closely monitoring useful data sent by the router itself, or by its gateway, if it has one. For example, if the router reports data usage by each of its clients on the local network to a central server, the size of each such report and the time required to send it across a specific link can itself be used as a test of that link. If the router does operate with a gateway, the specific protocol needed to coordinate routing optimizations between the router and the gateway can be expanded to include mutual feedback on data sent and received since the last exchange, taking any negative discrepancies therein, or high latency, as a sign of trouble.

Yet another type of embodiment with respect to evaluation would be to take precise measurements of latency into account. Some networking applications are more sensitive to responsiveness than to bandwidth, one example being the loading of a web page containing only dozens of small resources, such as low-resolution images, CSS files and short scripts. In the optimization of performance for such applications, latencies significantly lower than the three-second floor used in the ICMP timeout example above are relevant. Therefore, merit values can be given a further adjustment according to the findings of the last few successful ICMP requests, the precise time needed to complete a DNS query, etc.

Optimization of the assignment of streams to data links may also be performed in various ways. Given that the process of link evaluation produces scalar merit values for each link, the assignment can be accomplished by any of several very common shuffling and selection algorithms known in computer science, provided the requirements of the invention are met. For instance, treating merit values as fitness, a genetic algorithm may be applied, such as tournament selection, to choose a link for each new stream. However, the algorithm does not need to be literally random. It can be seeded with the array of key-value pairs formed by the set of links and their merit values, producing a deterministic system that is easier to troubleshoot.

In the case of fine-tuned evaluation for specific use cases, such as the precise measurements of latency mentioned above, an embodiment of this invention may attempt to determine the special needs of each new stream of traffic. For example, a stream that looks typical of voice over IP (VOIP), judging by its port numbers, its contents, or other factors, can be assigned to a link with especially low latency. A stream that looks typical of on-demand, non-live video streaming, which is less sensitive to latency, can be routed with emphasis on bandwidth. Such an embodiment of this invention may require several parallel implementations of its ideas, maintaining records of separate merit values for separate applications, and routing each stream according to the type of its source, however this knowledge is obtained.

The invention has now been described with reference to specific embodiments. However, several variations of the communication system are feasible. For example, other test(s) generating a predictable response are useable, assignment of data streams to data links may, based on the evaluation and tests, be performed in various ways, and may also include other parameters, etc. For example, even though the above specific embodiments are related to train, it is apparent that similar systems may also be used onboard other moving vehicles, such as ships, airplanes, busses, etc.

Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements. Further, a single unit may perform the functions of several means recited in the claims.

The invention claimed is:

1. A wireless communication system for a train, comprising:
    a plurality of antennas arranged on an exterior side of the train;
    an internal local area network (LAN) inside the train;
    at least one router in the train for receiving and transmitting wireless voice communication and data communication to and from a stationary communication server outside the train via said antennas, through at least one exterior mobile network, the at least one exterior mobile network providing at least two concurrently useable data links;
    wherein the internal LAN provides WiFi communication between the at least one router and at least one mobile terminal located inside the train; and
    wherein the router is arranged to transfer wireless voice communication via voice over WiFi (VoWIFI) between the at least one mobile terminal and the exterior mobile network,
    wherein the router is further adapted to inspect data packet streams transferred through the router via the protocol Internet Protocol Security to identify data packet streams having a high probability of being voice data packet streams, and to prioritize such identified data packet streams over other data packet streams having lower probability of being voice data packet streams.

2. The wireless communication system of claim 1, wherein the VoWIFI is used in accordance with the IEEE 802.11 standard.

3. The wireless communication system of claim 1, wherein the router is further adapted to prioritize data communication transferred via the protocol Internet Protocol Security over data communication transferred via other protocols.

4. The wireless communication system of claim 1, wherein the internal LAN comprises at least one wireless access point provided within the train and being connected to said router for wireless transferring of data communication between mobile terminals within the train and said router.

5. The wireless communication system of claim 1, wherein the router and the communication server are connected through a plurality of exterior mobile networks, which are simultaneously useable.

6. The wireless communication system of claim 1, wherein the router is arranged to communicate with the communication server on at least two different communication routes having different characteristics, and to automatically separate the communication traffic between said communication routes based on specific optimization conditions.

7. The wireless communication system of claim 1, wherein the router is arranged to prioritize voice communication over other data communication, so that lower latency is obtained for voice communication.

8. A wireless communication system for a train, comprising:
    a plurality of antennas arranged on an exterior side of the train;
    an internal local area network (LAN) inside the train;
    at least one router in the train for receiving and transmitting wireless voice communication and data communication to and from a stationary communication server outside the train via said antennas, through at least one exterior mobile network, the at least one exterior mobile network providing at least two concurrently useable data links;
    wherein the internal LAN provides WiFi communication between the at least one router and at least one mobile terminal located inside the train; and
    wherein the router is arranged to transfer wireless voice communication via voice over WiFi (VoWIFI) between the at least one mobile terminal and the exterior mobile network,
    further comprising at least one controller arranged to evaluate the quality of said data links, and to assign data streams to said data links at least partly based on said evaluated quality.

9. The wireless communication system of claim 8, wherein the evaluation, is based on measured times until automated response are received from requests arranged to trigger a determinable automated response repeatedly sent to said stationary communication server via said data links.

10. The wireless communication system of claim 8, wherein the requests triggering a determinable automated response are at least one of a request to a domain name system server and a determinable automated response using the ICMP protocol.

11. The wireless communication system of claim 8, wherein the evaluation, is based on quality determined based on ordinary data traffic between the router and a stationary server accessible through said exterior mobile network via said links, the stationary server being a gateway to convey data traffic from the router to other servers accessible through the exterior mobile network.

* * * * *